US007826951B2

(12) United States Patent
Pantle

(10) Patent No.: US 7,826,951 B2
(45) Date of Patent: Nov. 2, 2010

(54) METHOD AND DEVICE FOR DECIDING TO TRIGGER AND FOR TRIGGERING RESTRAINT SYSTEMS OF A MOTOR VEHICLE

(75) Inventor: Markus Pantle, Marbach Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 1040 days.

(21) Appl. No.: 10/593,435

(22) PCT Filed: Jan. 12, 2005

(86) PCT No.: PCT/EP2005/050106

§ 371 (c)(1),
(2), (4) Date: Sep. 18, 2006

(87) PCT Pub. No.: WO2005/090129

PCT Pub. Date: Sep. 29, 2005

(65) Prior Publication Data

US 2007/0213903 A1  Sep. 13, 2007

(30) Foreign Application Priority Data

Mar. 19, 2004  (DE)  .................. 10 2004 013 595

(51) Int. Cl.
*G05D 3/00* (2006.01)
(52) U.S. Cl. .................. 701/45; 180/271; 280/734; 340/436
(58) Field of Classification Search .................. 701/45, 701/19–20, 23–24, 119; 180/271; 280/728.1, 280/734–735; 241/122 R, 167 R; 104/281, 104/284, 88.04; 340/933
See application file for complete search history.

(56) References Cited

U.S. PATENT DOCUMENTS

| 6,405,132 | B1 |   | 6/2002 | Breed et al. |         |
|-----------|----|---|--------|--------------|---------|
| 7,209,819 | B2 | * | 4/2007 | Rothleitner  | 701/45  |
| 7,320,478 | B2 | * | 1/2008 | Gaboury et al. | 280/735 |
| 7,548,961 | B1 | * | 6/2009 | Fernandez et al. | 709/219 |

(Continued)

FOREIGN PATENT DOCUMENTS

EP  1 482 280  12/2004

(Continued)

OTHER PUBLICATIONS

Vieveen et al., Telematics and Dangerous Goods in the Netherlands, in Proceeding of the Vehicle Navigation and Information Systems Conference, Ottawa, Ontario (IEEE 1993). cited by other.*

(Continued)

*Primary Examiner*—Cuong H Nguyen
(74) *Attorney, Agent, or Firm*—Kenyon & Kenyon LLP

(57) ABSTRACT

The invention provides a method for deciding on the triggering of and controlling restraint systems of a motor vehicle, including the method steps of determining the current position of the motor vehicle; determining position-relevant environmental data of the motor vehicle; determining position-relevant reference values of the motor vehicle; determining position-relevant actual values of the motor vehicle; comparing the reference and actual values; and taking this data into account in the decision to trigger, and in the triggering of restraint systems. The invention also provides a device for this purpose.

2 Claims, 2 Drawing Sheets

U.S. PATENT DOCUMENTS

| | | | |
|---|---|---|---|
| 7,565,242 B2 * | 7/2009 | Lucas et al. | 701/301 |
| 2003/0139883 A1 | 7/2003 | Takafuji et al. | |
| 2003/0149530 A1 | 8/2003 | Stopczynski | |
| 2004/0108698 A1 * | 6/2004 | Rothleitner | 280/735 |
| 2006/0058964 A1 * | 3/2006 | Lucas et al. | 701/301 |
| 2006/0082110 A1 * | 4/2006 | Gaboury et al. | 280/735 |

FOREIGN PATENT DOCUMENTS

| | | | |
|---|---|---|---|
| JP | 2002-178864 | | 6/2002 |
| JP | 2004-4516193 T | | 6/2004 |
| WO | WO 02053419 | | 7/2002 |
| WO | PCT/EP05/50106 | * | 1/2005 |

OTHER PUBLICATIONS

Max Cameron & Alison Brown, Intelligent Transportation System: Mayday Becomes A Reality, in IEEE 1995 National Aerospace and Electronics Conference 1995. cited by other.*

Transportation Electronics: Proceedings of the International Congress on Transportation Electronics, Society of Automotive Engineers, Inc., Warrendale, PA Oct. 1986. cited by other.*

Alison Brown & Randy Silva, TIGET Mayday System for Motorists, in Proceedings of the Position Location and Navigation Symposium (IEEE 1994). cited by other.*

* cited by examiner

METHOD AND DEVICE FOR DECIDING TO TRIGGER AND FOR TRIGGERING RESTRAINT SYSTEMS OF A MOTOR VEHICLE

FIELD OF THE INVENTION

The invention relates to a method and device for deciding to trigger and for triggering restraint systems of a motor vehicle.

DESCRIPTION OF RELATED ART

Current control units for restraint systems, such as front, side and knee airbags or the like, as well as belt tensioners and belt-force limiters, are connected to different sensors via which they receive signals containing information about a potential collision and the course thereof. This information is transmitted, for example in the form of digital data signals, and evaluated in the control unit by suitable software using a specific algorithm.

When the so-called airbag control unit makes a triggering decision, in particular in the case of a rollover event, it takes into account only the sensor data and state variables derived therefrom, such as the integrated rotation rate, starting at the point in time when the sensor data reaches a certain threshold. Sensor values and state values from the previous history, i.e., before this threshold is reached, are not taken into account. In this case, the threshold denotes, for example, the exceeding of a certain value of a signal, for example, the amplitude of the signal from an acceleration sensor, a rotation rate sensor, or a sensor system that detects lifting of wheels off the road.

The disadvantage here is that the vehicle deflection, i.e., the starting position of the vehicle shortly before the rollover event is not taken into account. The vehicle deflection is difficult to calculate using sensors anyway, because vehicle dynamic variables and disturbance variables, such as vibrations caused by road irregularities and the like, interfere with a measurement.

If the motor vehicle is already in an instable state shortly before a rollover event, this is not taken into account in the decision to trigger, and in the triggering of the restraint systems. This may result in that the decision to trigger the restraint systems is made in a non-optimal manner or too late.

Moreover, data on the current location or position, speed, direction of travel, and route of a motor vehicle is available in a navigation system installed in the motor vehicle. However, until now, such data has not been used for deciding to trigger and for trigging restraint systems of a motor vehicle.

SUMMARY OF THE INVENTION

The present invention is based on the assumption that restraint systems including an associated control device as well as a navigation system are present in the motor vehicle.

The invention provides a method for deciding to trigger and for triggering restraint systems (5, 6, 7) of a motor vehicle (1), characterized by the method steps of: (S1) determining the current position of the motor vehicle (1); (S2) determining position-relevant environmental data of the motor vehicle (1); (S3) determining position-relevant reference values of the motor vehicle (1); (S4) determining position-relevant actual values of the motor vehicle (1); (S5) comparing the reference and actual values; and (S6) taking this data into account in the decision to trigger, and in the triggering of restraint systems (5, 6, 7).

The invention further provides A device for deciding to trigger and for triggering restraint systems (5, 6, 7) of a motor vehicle (1), comprising: a navigation system (2) having a sensor system (10), data sources (8, 9) for data about vehicle orientations, restraint systems (5, 6, 7), at least one electronic control device (3) for the restraint systems (5, 6, 7), and at least one device (4) for taking into account data, the device allowing data from the navigation system (2) to be linked to the electronic control device (3).

The method and device for deciding to trigger and for triggering restraint systems of a motor vehicle according to the present invention has the advantage that triggering decisions of the control system for restraint systems, such as airbags, of a motor vehicle are optimized, as well as the advantage that reversible restraint systems, such as reversible belt tensioners, of a motor vehicle are triggered in advance.

BRIEF DESCRIPTION OF THE DRAWINGS

The invention will be described in greater detail with reference to the following drawings wherein.

DETAILED DESCRIPTION OF THE INVENTION

Figure 1:
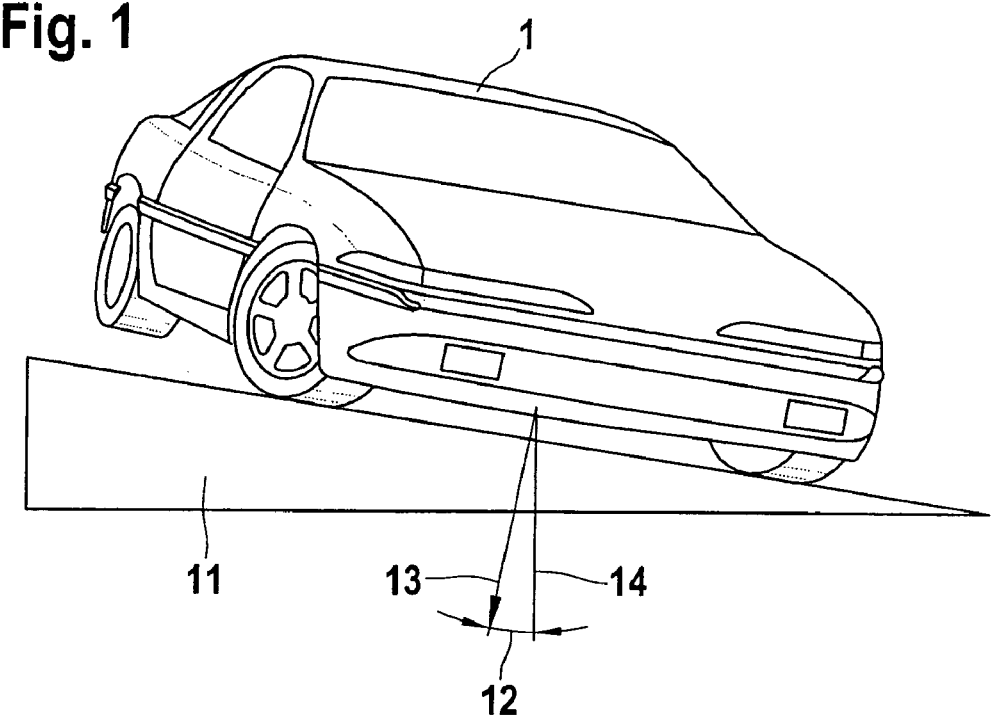
FIG. 1 shows a motor vehicle in a specific situation on a road.

The following is an explanation of the basic idea of the present invention, which consists in that the data available in the navigation system is taken into account and transmitted to the control unit of restraint systems. The position, speed, direction, and route of a motor vehicle are determined with the aid of the navigation system. Using geographic map material contained in a suitable storage medium, it is possible to determine the location of the motor vehicle. Having exact topographic map material in a storage medium makes it is possible, for example, to detect side banks, curves, rises, and the like, of a route of a motor vehicle. In this context, special attention is given to danger spots. In this manner, position-relevant reference values are determined for the traveling motor vehicle on a certain route for one or a multitude of different points that the motor vehicle passes on its route. Thus, a number of reference values for the behavior of the motor vehicle are available for the respective points that the motor vehicle passes on its route. These reference values are compared to the instantaneous values that are actually measured at the respective points for a particular motor vehicle.

Such a reference value can be, for example, an expected deflection of the motor vehicle in a curve. This means that the motor vehicle travels through the curve on a specific route, involving, for example, specific lateral acceleration values or steering angles. If the motor vehicle deviates from this previously calculated route, for example, because of excessive speed, then the comparison between the reference value and the actual value yields a certain value which is compared to another threshold value or to a predetermined table value.

Based on this deviation of the actual value from the reference value, corresponding dependent data is generated which contains information on how "dangerous" this deviation is for the particular driving state of the motor vehicle. This corresponding data can be generated in the form of an analog value or also in the form of a so-called data word including one or more bits. The data is then transmitted to the control device for the restraint systems. This transmission is, for example, via a bus system.

Thus, using this data on the particular driving situation, the control device for the restraint systems of a motor vehicle is able to optimize a decision to trigger or the triggering of restraint systems and/or to trigger reversible restraint systems in advance when there is a dangerous driving situation. This data can also be used to calculate the initial conditions of state variables, such as integrators and numerators.

It is advantageous if the method for deciding to trigger and for triggering restraint systems of a motor vehicle reads in position-relevant environmental data from a first data source and, in addition, position-relevant topology data from a second data source, because in this manner, the particular vehicle environment is advantageously completely available in a specific form of data.

In a further embodiment of the method of the present invention, the determination of position-relevant reference values of the motor vehicle includes the determination of reference values for the position, speed, direction and route of the motor vehicle for at least one of a multitude of points on the route of the motor vehicle, and the determination of reference values for the orientation of the motor vehicle based on the speed and direction of the motor vehicle for at least one of the multitude of points on the route of the motor vehicle that are defined by the previous sub-step. This advantageously allows early detection of danger points. This information can advantageously be used for further safety systems, such as automatic brake systems.

The determination of the orientation of the motor vehicle is performed based on the speed and direction of travel of the motor vehicle, for example, in curves.

In another embodiment of the inventive method, the determination of position-relevant actual values of the motor vehicle includes the determination of actual values for the position, speed, direction and route of the motor vehicle for at least one of the multitude of points on the route of the motor vehicle that are defined in the sub-steps for determining the position-relevant reference values of the motor vehicle, and further includes the determination of the actual orientation of the motor vehicle based on the actual values of the speed and direction of the motor vehicle. This allows the current positional state of the motor vehicle to be determined in an advantageous manner.

The method of the present invention has the further advantage that when comparing the reference and actual values of the motor vehicle, the result of this comparison of reference and actual values of the motor vehicle is compared to a predeterminable threshold value, and a corresponding signal is generated. Thus, vehicle-specific boundary conditions are also taken into account.

In order for this data to be taken into account in the decision to trigger and in the triggering of restraint devices, a further embodiment of the inventive method provides for relevant data to be transferred and/or provided as a function of the reference orientation of the motor vehicle and/or as a function of the actual orientation of the motor vehicle. In this manner, the data is brought into a conveniently simple form for further processing.

The inventive device for deciding to trigger and for triggering restraint devices of a motor vehicle includes at least one device for taking into account data, in which data from the navigation system is linked to the electronic control device. This device advantageously allows additional retrieval, evaluation and processing of data from the navigation system.

In another embodiment of the device according to the present invention, data about the environment and topology of the motor vehicle is available from the data source. Thus, the environmental data can be retrieved in an up-to-date and quick manner.

It is advantageous that, in a further embodiment, the device includes the device for taking into account data with a first device for determining the reference and actual values of the position of the motor vehicle using the data sources and a second device for comparing these reference and actual values. In this manner, the existing or determined data is converted into a form that is suitable for comparison and further processing.

Moreover, in another embodiment of the device, the device for taking into account data has a further device for transferring and/or providing data. For example, a suitable interface outputs data onto a bus system in such a way that the data reaches its destination address correctly, i.e., that the data can be correctly addressed and retrieved by the control unit.

One advantage of the present invention consists in that the triggering decisions of a control device of restraint systems are optimized; that is, since the measured data and state variables from the previous history are also used, the internal state variables correspond better to the actual course of the vehicle than without. For example, if the vehicle is on a bank before the threshold is exceeded, the triggering of the restraint systems (side and roof airbags) can be triggered earlier and in a more optimal manner for the occupants.

It is also advantageous that by taking into account and processing data of the navigation system, the particular driving situation can be assessed by the control device for restraint systems of a motor vehicle as to whether the driving style is risky, involving an increased probability of a rollover event. This allows reversible restraint systems, such as belt tensioners, to be actuated in advance.

Another advantage is the economic efficiency. If a motor vehicle is already provided with a navigation system, the consideration of the data can be transmitted to the airbag control unit without much additional effort, which is easily accomplished, for example, using an existing bus system. Moreover, the data can preferably be further processed in the airbag control unit.

A further advantage is that the data taken into account by the method and device of the present invention can be used in a predictive manner for the safety of a motor vehicle on its route. Usually, the driver of a motor vehicle is visually or audibly informed of the route ahead by a navigation system. This is accomplished via a display of the navigation system, and/or, in audible form, via an associated loudspeaker. The driver must translate this information into his/her driving style. A disadvantage of this translation process is that is involves a certain reaction time, which may possibly lead to a dangerous situation. Moreover, the driver is unable to constantly watch the display of the navigation system. Predictive use of the data processed by the method of the present invention not only allows the restraint systems to be sensitized and activated, but it is conceivable to automatically limit the speed of the motor vehicle. Frequently, visual and audible warning does not necessarily cause the driver to adapt the driving style to the given environment situation.

A motor vehicle can have front, side, window, knee and foot airbags, as well as belt tensioners and belt-force limiters. These so-called restraint systems 5, 6, 7 are connected to an airbag control unit or a control device 3 (see FIG. 2). Control device 3, in turn, receives information about a course of a potential collision from many different sensors. This information is evaluated by software using a so-called algorithm.

In the event of a motor vehicle rollover, certain information about the starting position of the vehicle shortly before the rollover is not taken into account in methods known heretofore. Part of this information, which relates to a starting position of a motor vehicle, is already available in a navigation system installed in the motor vehicle.

In the present invention, the already available information is taken into account and transmitted to the control device.

FIG. 1 shows a possible starting position of a motor vehicle.

In FIG. 1, a motor vehicle 1 is shown in a specific situation on a road 11. Road 11 is shown here with a slope in a cross-sectional view. This slope may exist, for example, in a curve, or as a side bank.

Using previously defined and also determined data based on previous positions for speeds and directions of motor vehicle 1, a navigation system 2 present in motor vehicle 1 has determined the position of motor vehicle 1 to be a reference position 14.

In the driving situation of motor vehicle 1 shown in FIG. 1, for example, motor vehicle 1 has not assumed reference position 14, for example because of excessive speed, but is in an actual position 13, which is shown by an arrow. This results in a deflection 12, which is determined by the method of the present invention and transmitted in a suitable data form to a control device 3 for restraint systems of motor vehicle 1 for a triggering decision and for further control of the restraint systems.

Figure 2:
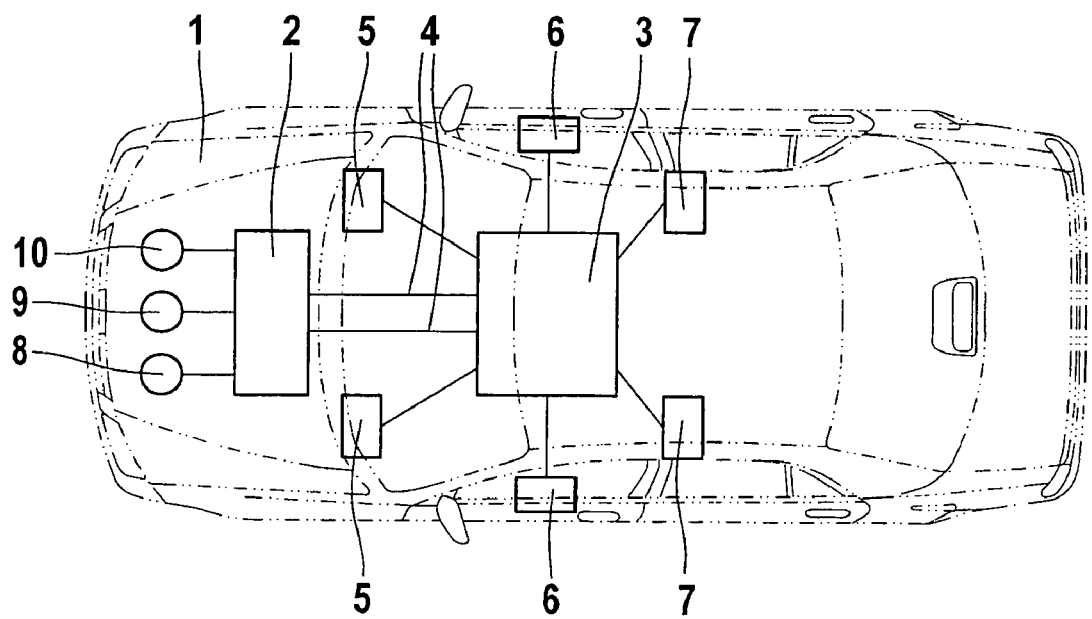
FIG. 2 is a schematic block diagram view of a specific embodiment of the device according to the present invention.

FIG. 2 is a schematic block diagram view of a specific embodiment of the device according to the present invention, which will be used in the following to describe the method of the present invention.

Motor vehicle 1 is equipped with a navigation system 2. This navigation system 2 determines, in a known manner, the position, speed, direction of the current position of motor vehicle 1.

Using geographic map material from a first data source 8, such as a CD-ROM or a DVD-ROM storage medium, it is possible to determine the location of the motor vehicle, for example, at a side bank. Environmental data which is relevant to the current position of the motor vehicle is read from this first data source 8. Additional precise environmental data of motor vehicle 1 is read in from a second data source 9, which contains specific topology data of the respective environment. Second data source 9 can also be, for example, a CD-ROM or DVD-ROM memory. This environmental data may be limited, for example, to specific important data and danger points.

Navigation system 2 further uses known data from a sensor system 10 of the motor vehicle, for example, speed, direction of travel, and distance traveled.

Navigation system 2 determines reference values for the position, speed, direction, and route of motor vehicle 1 for further points on the route of motor vehicle 1. In addition, reference values for the orientation of motor vehicle 1 are determined for these points based on the speed and direction of motor vehicle 1. The determination of the orientation of the motor vehicle is performed based on the speed and direction of travel of the motor vehicle, for example, in curves.

The points on the route of motor vehicle 1 may primarily be points at which the probability of an accident is increased. These are, for example, curves, blind rises, bridges, and the like, which have been read in from data sources 8, 9.

Navigation system 2 further determines actual values for the position, speed, direction and route of motor vehicle 1. In addition, the actual orientation of motor vehicle 1 is determined based on the actual values of the speed and direction of motor vehicle 1.

Moreover, sensor system 10 can include additional sensors which are able to detect lifting of wheels of motor vehicle 1 off the road. The data supplied by these sensors are taken into account as further actual values of the current state of the motor vehicle. However, these sensors can also be part of an airbag control unit. In this case, the signals of these sensors are already taken into account by the airbag control unit in its triggering decision.

The determination of the reference and actual values of the position of motor vehicle 1 using data sources 8, 9 may be performed either by navigation system 2 or by a device 4 for taking into account data. This device 4 for taking into account data can be part of navigation system 2 or be an independent unit.

Device 4 for taking into account data performs a comparison of the previously defined or determined reference and actual values, and compares these results to at least one predeterminable threshold and/or reference value. A corresponding signal or data signal is generated based on this comparison. This can be done by generating, for example, a bit sequence.

This bit sequence, or corresponding data, contains information which is dependent firstly on the reference orientation of motor vehicle 1 and also on the actual orientation of motor vehicle 1. This data is used for deciding to trigger and for triggering restraint systems 5, 6, 7 connected to an electronic control device 3.

Electronic control device 3 can be, for example, an airbag control unit. By transmitting corresponding data as a function of the reference orientation and the actual orientation of motor vehicle via device 4 for taking into account data, the triggering decision for restraint systems 5, 6 in the form of, for example, front and side airbags in the event of a potential imminent rollover of motor vehicle 1 is made easier and faster.

The data transmitted by device 4 for taking into account data is also used to activate restraint systems, such as belt tensioners, if a higher-risk driving style is detected based the reaching of threshold and/or reference values.

Alternatively, instead of using a local data memory, the topology data can be provided over a network from a data memory which is not located in the vehicle, for example, via a wireless connection, such as satellite communication.

Figure 3:
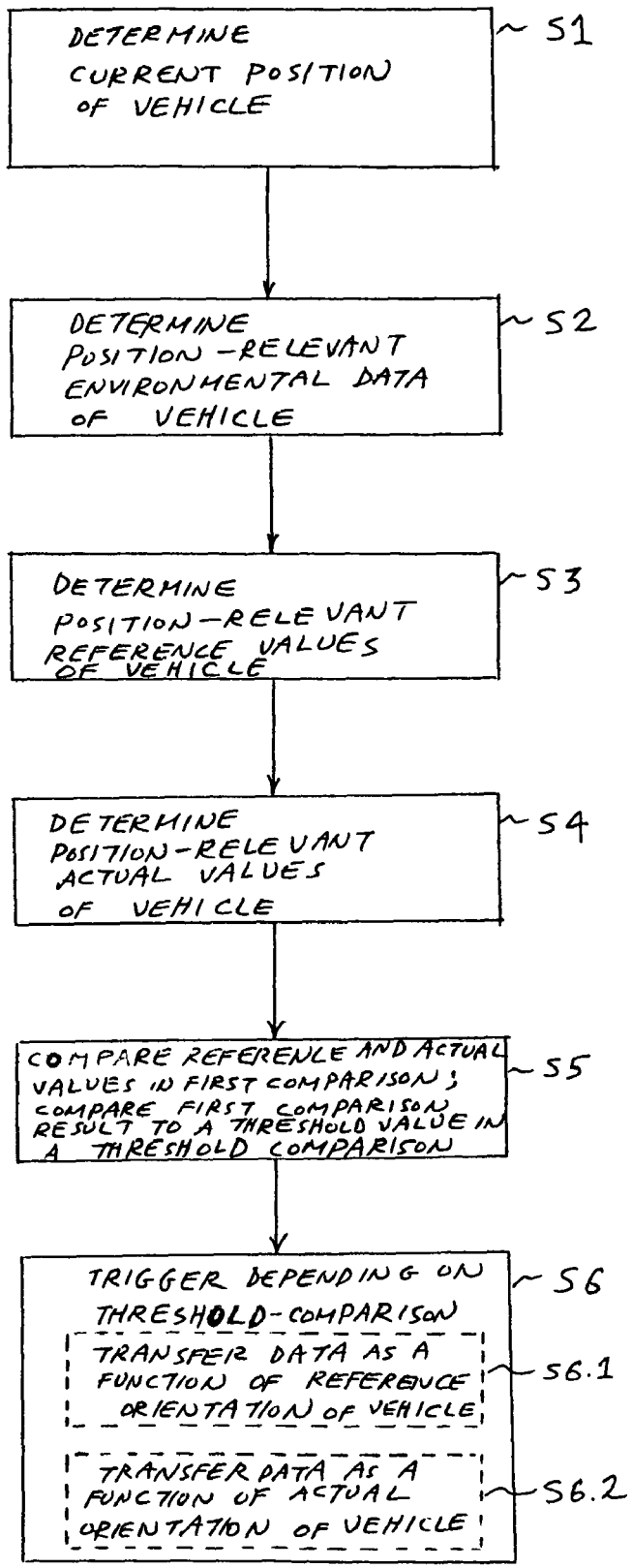
FIG. 3 is a schematic block diagram illustrating the various steps of the example method according to the present invention.

As shown in FIG. 3, an example method for triggering at least one restraint system (5, 6, 7) of a motor vehicle (1) may include the following steps:

(S1) determining a current position of the motor vehicle (1);

(S2) determining position-relevant environmental data of the motor vehicle (1), wherein the determining of position-relevant environmental data includes reading-in environmental data which is relevant to the current position of the motor vehicle from a first data source (8) and reading-in related position-relevant topology data from a second data source (9);

(S3) determining position-relevant reference values of the motor vehicle (1), wherein the determining of position-relevant reference values includes determining reference values for the position, speed, direction and route of the motor vehicle for at least one of a multitude of points on the route of the motor vehicle and determining reference values for the orientation of the motor vehicle based on the speed and direction of the motor vehicle for the at least one of the multitude of points on the route of the motor vehicle;

(S4) determining position-relevant actual values of the motor vehicle (1), wherein the determining of position-relevant actual values includes determining actual values for the position, speed, direction and route of the motor vehicle for the at least one of a multitude of points on the route of the motor vehicle and determining the actual orientation of the motor vehicle based on the actual values of the speed and direction of the motor vehicle;

(S5) comparing the position-relevant reference values and position-relevant actual values to generate a first comparison result, and comparing the first comparison result to a predetermined threshold value to generate a threshold-comparison output signal; and (S6) triggering the at least one restraint system (5, 6, 7) depending on the threshold-comparison output signal.

The triggering of the at least one restraint system in step (S6) may include at least one of: (S6.1) transferring or providing relevant data as a function of the reference orientation of the motor vehicle (1); and (S6.2) transferring or providing relevant data as a function of the actual orientation of the motor vehicle (1).

The invention is not limited to the exemplary embodiments described above, but may be modified in various ways.

Thus, for example, it is conceivable for device 4 for taking into account data to be integrated into electronic control device 3, with a suitable data link existing between navigation system 2 and electronic control device 3.

Furthermore, it is also possible for navigation system 2, device 4 for taking into account data, and electronic control device 3 to communicate over a common bus system.

What is claimed is:

1. A method for triggering at least one restraint system of a motor vehicle, comprising:

(S1) determining a current position of the motor vehicle;

(S2) determining position-relevant environmental data of the motor vehicle, wherein the determining of position-relevant environmental data includes reading-in environmental data which is relevant to the current position of the motor vehicle from a first data source and reading-in related position-relevant topology data from a second data source;

(S3) determining position-relevant reference values of the motor vehicle, wherein the determining of position-relevant reference values includes determining reference values for the position, speed, direction and route of the motor vehicle for at least one of a multitude of points on the route of the motor vehicle and determining reference values for the orientation of the motor vehicle based on the speed and direction of the motor vehicle for the at least one of the multitude of points on the route of the motor vehicle;

(S4) determining position-relevant actual values of the motor vehicle, wherein the determining of position-relevant actual values includes determining actual values for the position, speed, direction and route of the motor vehicle for the at least one of a multitude of points on the route of the motor vehicle and determining the actual orientation of the motor vehicle based on the actual values of the speed and direction of the motor vehicle;

(S5) comparing the position-relevant reference values and position-relevant actual values to generate a first comparison result, and comparing the first comparison result to a predetermined threshold value to generate a threshold-comparison output signal; and (S6) triggering the at least one restraint system depending on the threshold-comparison output signal.

2. The method according to claim 1, wherein the triggering of the at least one restraint system in step (S6) includes at least one of:

(S6.1) transferring or providing relevant data as a function of the reference orientation of the motor vehicle (1); and (S6.2) transferring or providing relevant data as a function of the actual orientation of the motor vehicle (1).

* * * * *